US011799937B2

(12) United States Patent
Sodagar

(10) Patent No.: US 11,799,937 B2
(45) Date of Patent: Oct. 24, 2023

(54) CMAF CONTENT PREPARATION TEMPLATE USING NBMP WORKFLOW DESCRIPTION DOCUMENT FORMAT IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/725,844

(22) Filed: Apr. 21, 2022

(65) Prior Publication Data

US 2022/0368752 A1  Nov. 17, 2022

Related U.S. Application Data

(60) Provisional application No. 63/187,807, filed on May 12, 2021.

(51) Int. Cl.
*H04L 65/752* (2022.01)

(52) U.S. Cl.
CPC ................... *H04L 65/752* (2022.05)

(58) Field of Classification Search
CPC ....... H04L 65/752; H04L 65/65; H04L 67/02; H04L 65/61; H04L 65/762; H04L 65/75; H04N 21/2343; H04N 21/2347; H04N 21/235; H04N 21/2381; H04N 21/254; H04N 21/435; H04N 21/00; H04N 21/23; H04N 21/23614; H04N 21/6131; H04N 21/236; H04N 21/61
See application file for complete search history.

(56) References Cited

U.S. PATENT DOCUMENTS

| | | | |
|---|---|---|---|
| 2019/0394498 A1* | 12/2019 | Lo | H04N 21/239 |
| 2020/0092530 A1* | 3/2020 | Wang | H04N 23/90 |
| 2021/0105338 A1* | 4/2021 | Oyman | H04L 67/146 |
| 2021/0385514 A1* | 12/2021 | Da Silva Pratas Gabriel | ............ H04N 21/234345 |
| 2022/0007086 A1* | 1/2022 | Stockhammer | H04N 21/845 |
| 2022/0053244 A1* | 2/2022 | Bae | H04L 65/40 |

OTHER PUBLICATIONS

International Search Report dated Jul. 25, 2022 in International Application No. PCT/US2022/027564.
(Continued)

*Primary Examiner* — George C Neurauter, Jr.
*Assistant Examiner* — Mehulkumar J Shah
(74) *Attorney, Agent, or Firm* — Sughrue Mion, PLLC

(57) ABSTRACT

Systems, devices, and methods for media processing and streaming, including receiving content to be prepared for a 5G media streaming (5GMS) corresponding to an input Common Media Application Format (CMAF) track and a set of output CMAF tracks; determining a content preparation template (CPT), wherein the CPT includes a Network Based Media Processing (NBMP) workflow description document (WDD) which specifies an input format of the input CMAF track, and an array of task instances corresponding to the set of output CMAF tracks; preparing the content according to the CPT; and streaming the prepared content over the 5GMS network to a media streaming client.

17 Claims, 7 Drawing Sheets

(56) References Cited

OTHER PUBLICATIONS

Written Opinion of the International Searching Authority dated Jul. 25, 2022 in International Application No. PCT/US2022/027564.
"3rd Generation Partnership Project; Technical Specification Group Services and System Aspects; 5G Media Streaming (5GMS); General description and architecture (Release 16)," 3GPP TS 26.501 V16.3.1, Mar. 2020, pp. 1-63.
"3rd Generation Partnership Project; Technical Specification Group Services and System Aspects; 5G Media Streaming (5GMS); Protocols (Release 16)," 3GPP TS 26.512 V16.1.0, Dec. 2020, pp. 1-96.
"Text of ISO/IEC FDIS 23090-8 Network-based media processing," ISO/IEC JTC1/SC29/WG11, N19062, ISO FDIS 23090-8:2020(E), Apr. 2020, 105 total pages.
Extended European Search Report dated Apr. 17, 2023 in European Application No. 22789450.8.
Thorsten Lohmar et al.: "LS from SA WG4: LS on Traffic Identification within 5G Media Streaming", 3GPP Draft; S2-2203628, Apr. 2022, Retrieved from the Internet: URL:https://www.3gpp.org/ftp/tsg_sa/WG2_Arch/TSGS2J 51 E_Electronic_2022-05/Docs/S2-2203628.zip S4-220248.zip S4-220248 26804-110.docx (129 Pages).
Tencent, "[FS_5GMS-EXT] Candidate solution for Content Preparation format", 3GPP SA4#114-e, S4-210940, revision of S4-210765, Sophia-Antipolis Cedex, France, May 19-28, 2021, (6 pages total).
"Potential improvements of ISO/IEC 23090-8 Network-based Media Processing", Text of ISO/IEC FDIS 23090-8 Network-based Media Processing, ISO/IEC JTC1/SC29/WG11, N19062, ISO 23090-8:2020(E), Jan. 2020, pp. 1-119 (129 total pages).
"WD of ISO/IEC 23000-19 2nd edition CMAF", ISO/IEC JTC1/SC29/WG11, No. n18409, ISO/IEC 23000-19(E), Mar. 2019, pp. 1-144 (150 pgs total).

\* cited by examiner

CMAF CONTENT PREPARATION TEMPLATE USING NBMP WORKFLOW DESCRIPTION DOCUMENT FORMAT IN 5G NETWORKS

CROSS-REFERENCE TO RELATED APPLICATION

This application claims priority from U.S. Provisional Application No. 63/187,807, filed on May 12, 2021, in the United States Patent and Trademark Office, the disclosure of which is incorporated herein by reference in its entirety.

FIELD

Embodiments of this disclosure are directed to media processing and streaming methods and systems, more particularly to preparing content based on content preparation templates.

BACKGROUND

3rd Generation Partnership Project (3GPP) TS26.512 (3rd Generation Partnership Project; Technical Specification Group Services and System Aspects; 5G Media Streaming (5GMS); Protocols (Release 16), V1.1.0) defines the concept of content preparation template to set up the processing of the media streams before hosting the content for streaming. It also defines the content hosting configuration for the distribution of the content. However, it doesn't define a format for the content preparation template.

SUMMARY

According to one or more embodiments, a method of content preparation for a 5G media streaming (5GMS) network performed by at least one processor includes receiving content to be prepared for the 5GMS corresponding to an input Common Media Application Format (CMAF) track and a set of output CMAF tracks; determining a content preparation template (CPT), wherein the CPT includes a Network Based Media Processing (NBMP) workflow description document (WDD) which specifies an input format of the input CMAF track, and an array of task instances corresponding to the set of output CMAF tracks; preparing the content according to the CPT; and streaming the prepared content over the 5GMS network to a media streaming client.

According to one or more embodiments, a device for content preparation for a 5GMS network includes at least one memory configured to store program code; and at least one processor configured to read the program code and operate as instructed by the program code, the program code including: receiving code configured to cause the at least one processor to receive content to be prepared for the 5GMS corresponding to an input Common Media Application Format (CMAF) track and a set of output CMAF tracks; determining code configured to cause the at least one processor to determine a content preparation template (CPT), wherein the CPT includes a Network Based Media Processing (NBMP) workflow description document (WDD) which specifies an input format of the input CMAF track, and an array of task instances corresponding to the set of output CMAF tracks; preparing code configured to cause the at least one processor to prepare the content according to the CPT; and streaming code configured to cause the at least one processor to stream the prepared content over the 5GMS network to a media streaming client.

According to one or more embodiments, a non-transitory computer-readable medium stores instructions, the instructions including: one or more instructions that, when executed by one or more processors of a device for content preparation for a 5GMS network, cause the one or more processors to: receive content to be prepared for the 5GMS corresponding to an input Common Media Application Format (CMAF) track and a set of output CMAF tracks; determine a content preparation template (CPT), wherein the CPT includes a Network Based Media Processing (NBMP) workflow description document (WDD) which specifies an input format of the input CMAF track, and an array of task instances corresponding to the set of output CMAF tracks; prepare the content according to the CPT; and stream the prepared content over the 5GMS network to a media streaming client.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
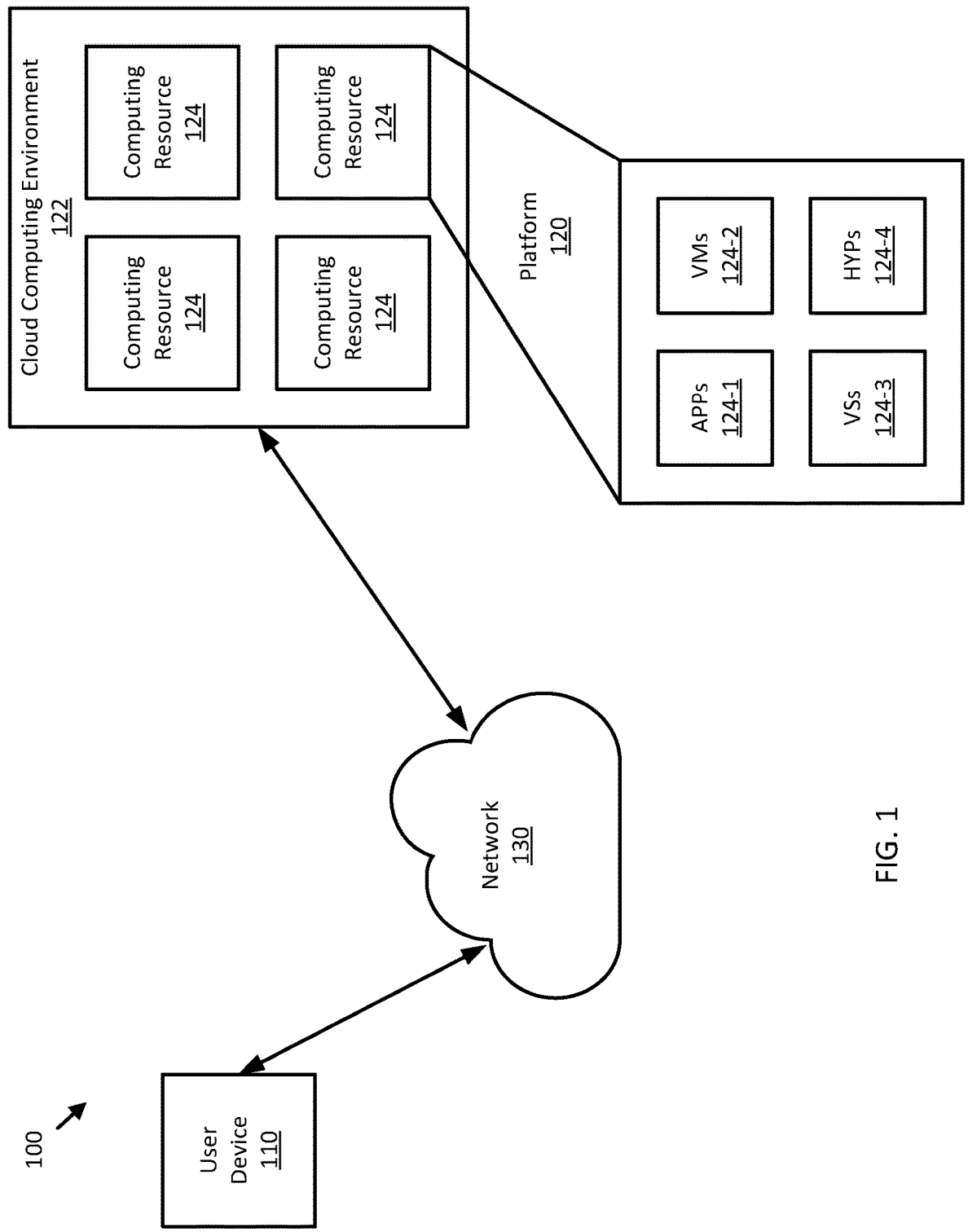
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
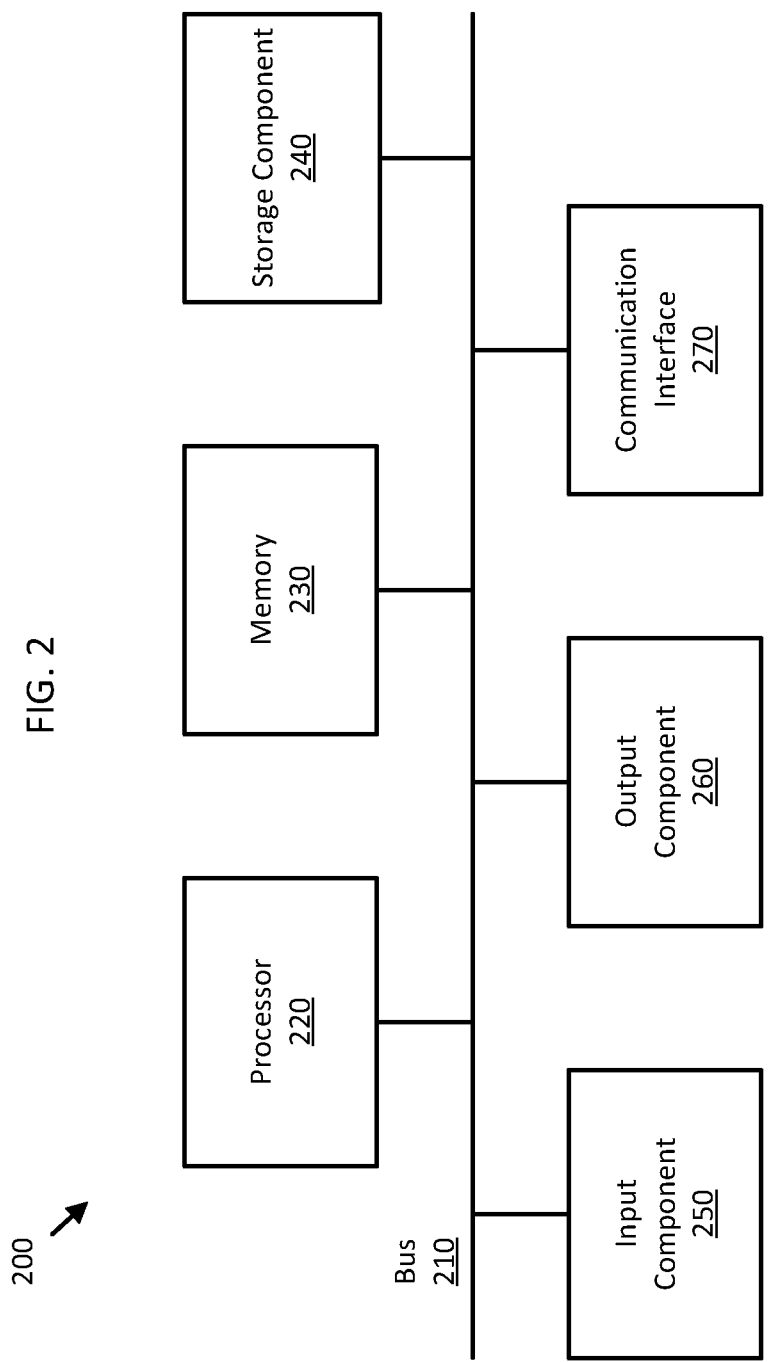
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of a content preparation template (CPT) to prepare received content for downlink streaming. However, it doesn't define any specific template for content preparation.

Figure 3:
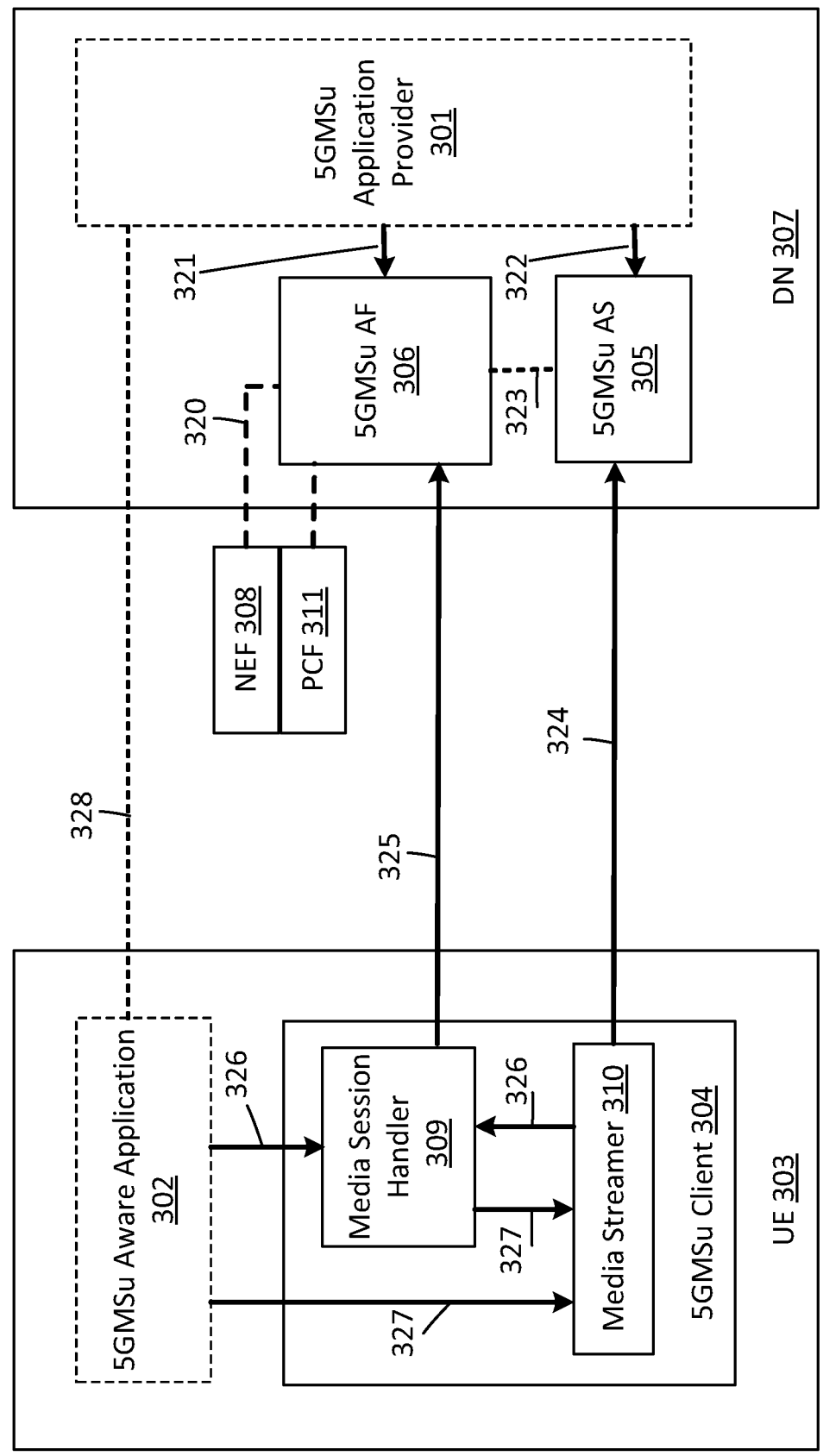
FIG. 3 is a block diagram of a media architecture for media uplink streaming, according to embodiments.
Figure 4:
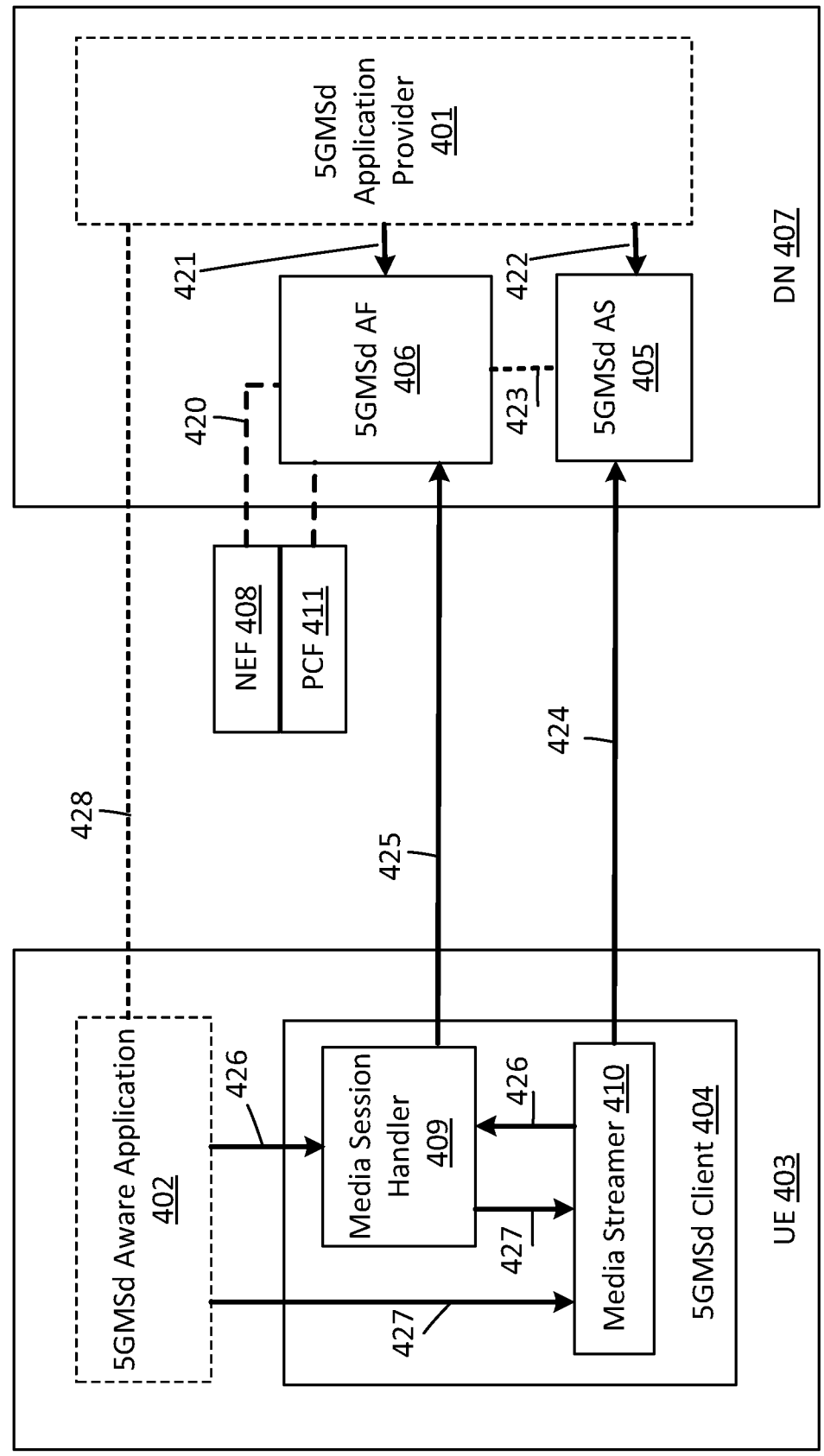
FIG. 4 is a block diagram of a media architecture for media downlink streaming, according to embodiments.

A 5G media-streaming architecture for downlink and uplink streaming is shown in FIGS. 3 and 4.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 303 by implementing external application or content service provider specific logic and enabling the establishment of a media session. 5GMSu AS 305 may host 5G media functions. 5GMSu Application Provide 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interface. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

FIG. 4 is a diagram of a media architecture 400 for media downlink streaming. A 5G media streaming downlink (5GMSd) Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd Application Server (AS) may be an AS dedicated to 5G Media Downlink Streaming. 5GMSd Client 404 may be a UE 403 internal function dedicated to 5G Media Downlink Streaming.

5GMSd Application Function (AF) 406 and 5GMSd AS 405 may be Data Network (DN) 407 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 403 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different Policy or Charging Function (PCF) 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5:
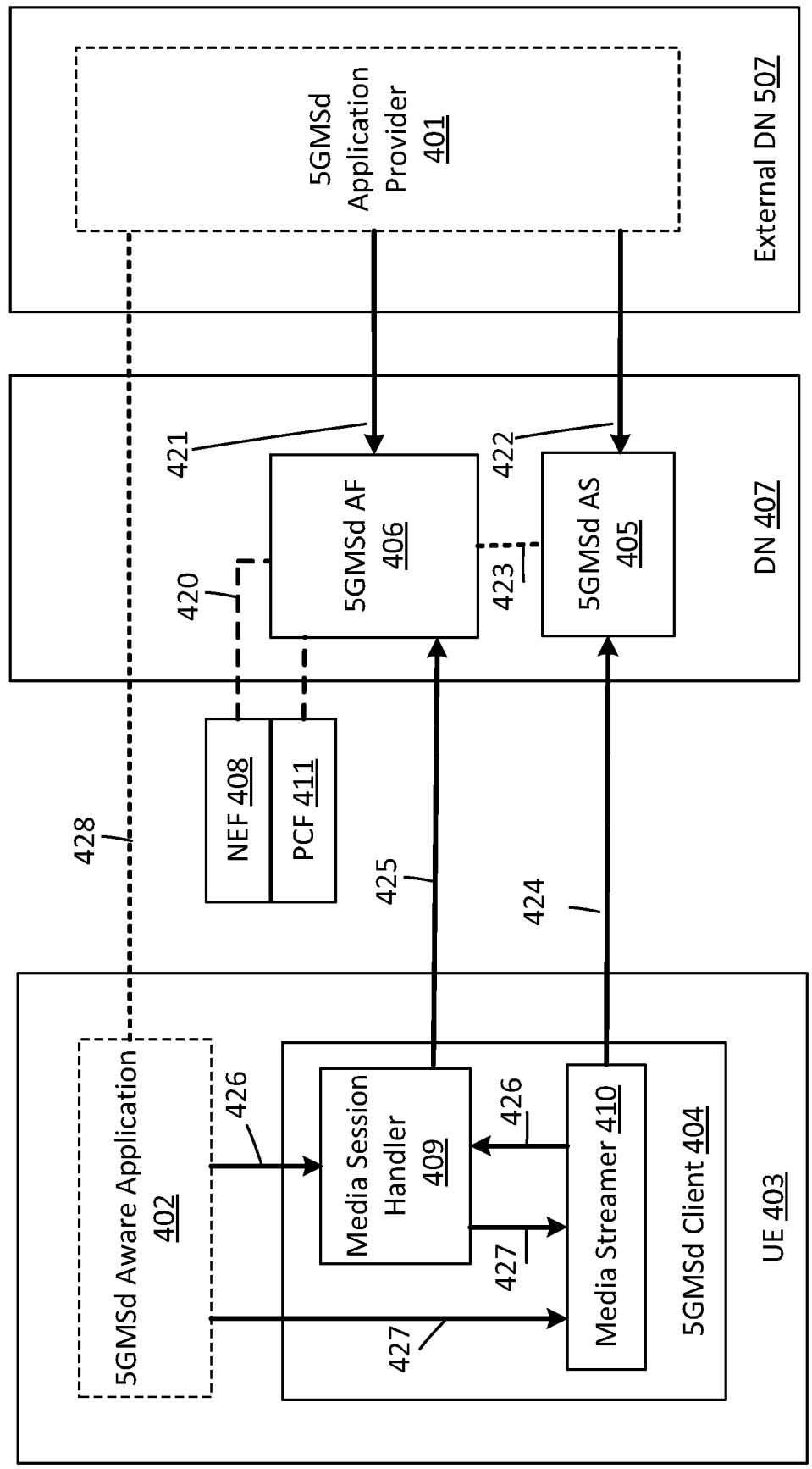
FIG. 5 is a block diagram of a media architecture for media downlink streaming, according to embodiments.

FIG. 5 is a diagram of a media architecture 500 for media downlink streaming, according to embodiments. As can be seen in FIG. 5, media architecture 500 may be similar to media architecture 400, except that 5GMSd Aware Application 402, 5GMSd AF 406, and 5GMSd AS 405 may be in communication with 5GMSd Application Provider 501. In embodiments, 5GMSd Application Provider 501 may be included in external DN 507, rather than trusted DN 407.

As discussed above, 3GPP TS26.512 defines the concept of content preparation template to prepare received content for downlink streaming, but does not define a format for the content preparation template.

According to embodiments, a use-case for embodiments discussed herein may include a streaming scenario in which a single common media application format (CMAF) track is provided as an input, and a single unencrypted CMAF switching set is provided as an output.

For example, in embodiments, the following constraints may be used for producing CMAF streaming content:
1. The input to the content preparation may be one CMAF track.
2. The output may be a set of CMAF tracks as part of one CMAF Switching Set.
3. The input and output tracks may be unencrypted.

The NBMP specification (ISO/IEC JTC1/SC29/WG11/N19062 MPEG-I: Network-based Media Processing 23090-8 FDIS Network-Based Media Processing Specification) can describe an entire workflow using the NBMP Workflow Description Document (WDD). In this use case, the WDD may describe the input format, as well as an array of task instances and/or function instances, each of which may define a CMAF output track as well as the encoding parameters for that track.

Figure 6:
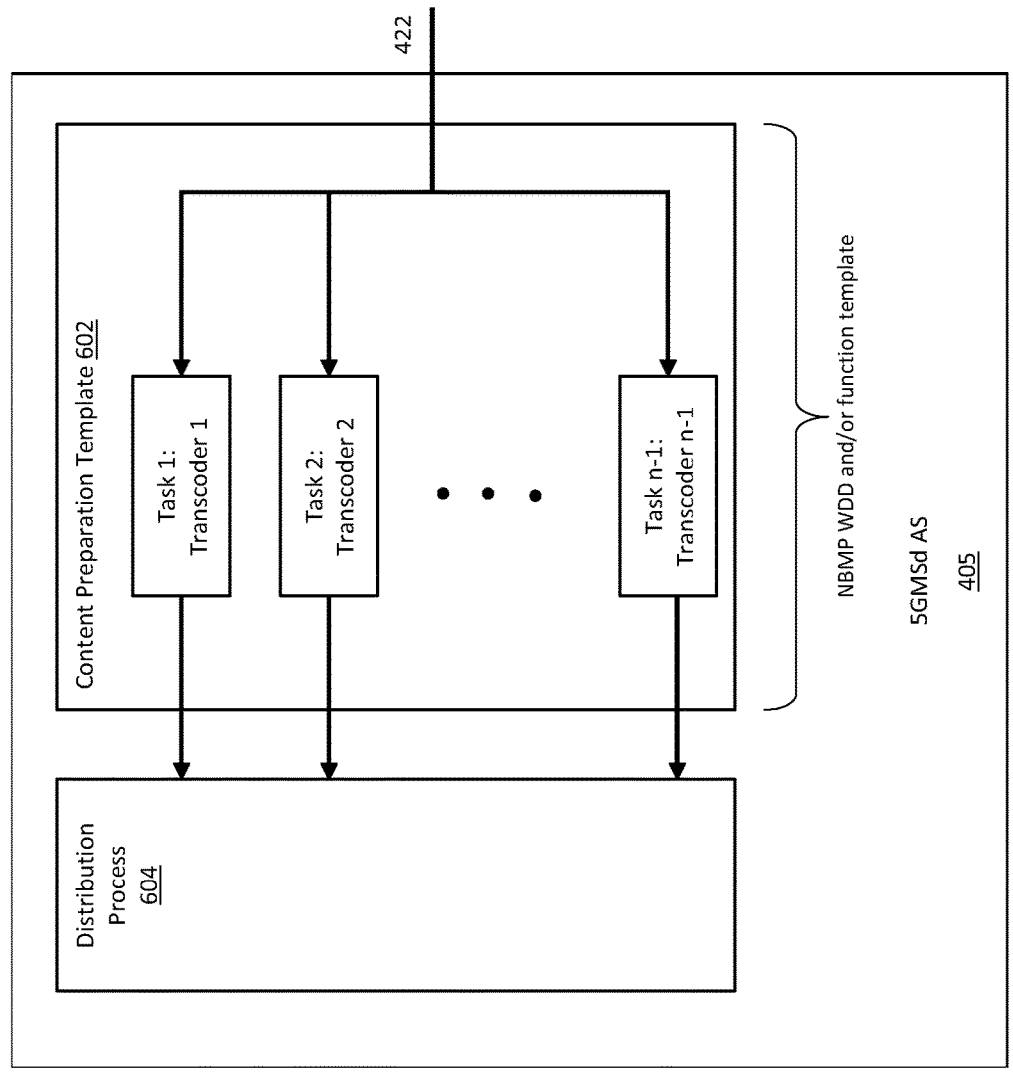
FIG. 6 is a block diagram of an application server, according to embodiments

For example, as shown in FIG. 6, a content preparation template 602 may include an NMBP WDD and/or function template, which may include an array of task instances such as Task 1 through Task n−1, and function instances such as Transcoder 1 through Transcoder n−1. In embodiments, each of the task instances and/or function instances may correspond to a particular CMAF output track as well as the encoding parameters for that track, and may for example assist in providing the CMAF output track to distribution process 604.

In embodiments, the NBMP WDD may describe the input CMAF as the input of workflow and each task's function, configurations, and output. Because many features of NBMP specification may be not used in this specific workflow, the WDD features can be profiled to be a simple WDD not using several descriptors defined by NBMP.

The NBMP specification allows defining function templates. So, according to embodiments, one way to simplify the support for NBMP by a 5GMSd AS may be to define a function template for CMAF content preparation. The NBMP CMAF function template may, among other things, define the following:
1. Input CMAF media profile using explicit description, MPD, or HTTP Live Streaming (HLS) m3u8 protocol.
2. The push and pull protocols for input CMAF
3. The CMAF outputs format
4. The transcoder's common and vendor-specific configuration parameters
5. Multiple codec output
6. Reporting, monitoring, and notification parameters for each transcoding functions In embodiments, an advantage of this solution may be that the WDD format can be used for describing other use-cases and therefore one single format may be able to address several use-cases.

Accordingly, embodiments may provide a method for defining the CMAF content preparation template using NBMP Workflow Description Document (WDD) wherein the input and output characteristics, as well the encoding parameters for each output is defined using an NBMP WDD, where each encoder considered a function instance/task that describes the path to an output and the encoding parameters are described in form of the function instance configuration parameters.

In addition, embodiments may provide a method of defining the CMAF content preparation template as above, while defining the content preparation template as an NBMP reference function template wherein the function template has limited features of NBMP WDD and therefore is easier to be parsed and processed, wherein this function template has standard input and output descriptions as well as the configuration parameters for each of its encode path.

Figure 7:
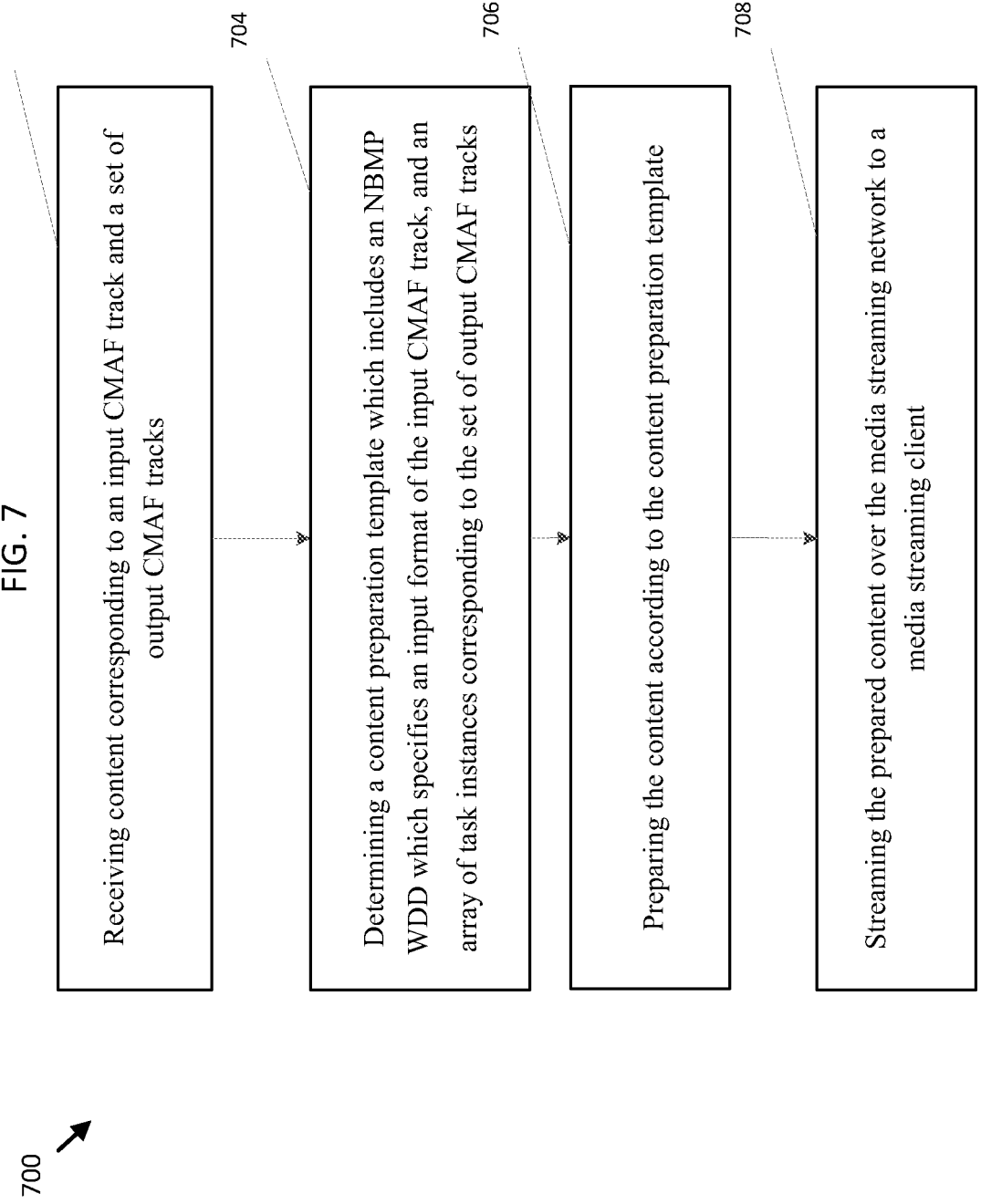
FIG. 7 is a flowchart of an example process for content preparation for a media streaming network, according to embodiments.

FIG. 7 is a flowchart of example process 700 of content preparation for a media streaming network, for example a 5GMS network. In some implementations, one or more process blocks of FIG. 7 may be performed by 5GMSd AF 406. In some implementations, one or more process blocks of FIG. 7 may be performed by another device or a group of devices separate from or including 5GMSd AF 406, such as 5GMSu AF 306, 5GMSu Application Provider 301, 5GMSu Application Provider 401, or other elements of DN 307, DN 407, and external DN 507.

As shown in FIG. 7, process 700 may include receiving content corresponding to an input Common Media Application Format (CMAF) track and a set of output CMAF tracks (block 702). In embodiments, the content may be content to be prepared for media streaming or a media streaming network, for example content prepared for 5GMS, or for a 5GMS network.

As further shown in FIG. 7, process 700 may include determining a content preparation template (CPT), wherein the CPT includes a Network Based Media Processing (NBMP) workflow description document (WDD) which specifies an input format of the input CMAF track, and an array of task instances corresponding to the set of output CMAF tracks (block 704).

As further shown in FIG. 7, process 700 may include preparing the content according to the content preparation template (block 706).

As further shown in FIG. 7, process 700 may include streaming the prepared content over the media streaming network, for example the 5GMS network, to a media streaming client (block 708).

In embodiments, each task instance of the array of task instances may specify output characteristics of an output CMAF track of the set of output CMAF tracks, and encoding parameters corresponding to the output CMAF track.

In embodiments, the CPT may include a function template for CMAF content preparation.

In embodiments, the function template may specify an input CMAF media profile corresponding to the input CMAF track using at least from among a media presentation description document, or a protocol corresponding to Hypertext Transfer Protocol Live Streaming.

In embodiments, the function template may specify a push protocol and a pull protocol for the input CMAF track.

In embodiments, the function template may specify an output format for the set of output CMAF tracks.

In embodiments, the function template may specify at least one from among a common parameter and a vendor-specific parameter corresponding to a transcoder related to the content.

In embodiments, the function template may specify at least one codec corresponding to the set of output CMAF tracks.

In embodiments, the function template may specify at least one from among a reporting parameter, a monitoring parameter, and a notification parameter of a transcoding function corresponding to the content.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of content preparation for a 5G media streaming (5GMS) network performed by at least one processor, the method comprising:
   receiving content to be prepared for the 5GMS corresponding to an input Common Media Application Format (CMAF) track and a set of output CMAF tracks;
   determining a content preparation template (CPT), wherein the CPT includes a Network Based Media Processing (NBMP) workflow description document (WDD) which specifies an input format of the input CMAF track, and an array of instances comprising task instances and corresponding function instances, each instance of the array corresponding to the set of output CMAF tracks, wherein each instance of the array specifies a path to an output CMAF track of the set of output CMAF tracks, and wherein each encoding parameter corresponding to the output CMAF track is described as a function instance configuration parameter associated with the task instance corresponding to the output CMAF track;
preparing the content according to the CPT; and
streaming the prepared content over the 5GMS network to a media streaming client.

2. The method of claim 1, wherein the CPT comprises a function template for CMAF content preparation.

3. The method of claim 2, wherein the function template specifies an input CMAF media profile corresponding to the input CMAF track using at least from among a media presentation description document, or a protocol corresponding to Hypertext Transfer Protocol Live Streaming.

4. The method of claim 2, wherein the function template specifies a push protocol and a pull protocol for the input CMAF track.

5. The method of claim 2, wherein the function template specifies an output format for the set of output CMAF tracks.

6. The method of claim 2, wherein the function template specifies at least one from among a common parameter and a vendor-specific parameter corresponding to a transcoder related to the content.

7. The method of claim 2, wherein the function template specifies at least one codec corresponding to the set of output CMAF tracks.

8. The method of claim 2, wherein the function template specifies at least one from among a reporting parameter, a monitoring parameter, and a notification parameter of a transcoding function corresponding to the content.

9. A device for content preparation for a 5G media streaming (5GMS) network, the device comprising:
at least one memory configured to store program code; and
at least one processor configured to read the program code and operate as instructed by the program code, the program code including:
receiving code configured to cause the at least one processor to receive content to be prepared for the 5GMS corresponding to an input Common Media Application Format (CMAF) track and a set of output CMAF tracks;
determining code configured to cause the at least one processor to determine a content preparation template (CPT), wherein the CPT includes a Network Based Media Processing (NBMP) workflow description document (WDD) which specifies an input format of the input CMAF track, and an array of instances comprising task instances and corresponding function instances, each instance of the array corresponding to the set of output CMAF tracks, wherein each instance of the array specifies a path to an output CMAF track of the set of output CMAF tracks, each instance of the array comprises an encoding parameter corresponding to the output CMAF track, and the encoding parameter is associated with the task instance corresponding to the output CMAF track;
preparing code configured to cause the at least one processor to prepare the content according to the CPT; and
streaming code configured to cause the at least one processor to stream the prepared content over the 5GMS network to a media streaming client.

10. The device of claim 9, wherein the CPT comprises a function template for CMAF content preparation.

11. The device of claim 10, wherein the function template specifies an input CMAF media profile corresponding to the input CMAF track using at least from among a media presentation description document, or a protocol corresponding to Hypertext Transfer Protocol Live Streaming.

12. The device of claim 10, wherein the function template specifies a push protocol and a pull protocol for the input CMAF track.

13. The device of claim 10, wherein the function template specifies an output format for the set of output CMAF tracks.

14. The device of claim 10, wherein the function template specifies at least one from among a common parameter and a vendor-specific parameter corresponding to a transcoder related to the content.

15. The device of claim 10, wherein the function template specifies at least one codec corresponding to the set of output CMAF tracks.

16. The device of claim 10, wherein the function template specifies at least one from among a reporting parameter, a monitoring parameter, and a notification parameter of a transcoding function corresponding to the content.

17. A non-transitory computer-readable medium storing instructions, the instructions comprising: one or more instructions that, when executed by one or more processors of a device for content preparation for a 5G media streaming (5GMS) network, cause the one or more processors to:
receive content to be prepared for the 5GMS corresponding to an input Common Media Application Format (CMAF) track and a set of output CMAF tracks;
determine a content preparation template (CPT), wherein the CPT includes a Network Based Media Processing (NBMP) workflow description document (WDD) which specifies an input format of the input CMAF track, and an array of instances comprising task instances and corresponding function instances, each instance of the array corresponding to the set of output CMAF tracks, wherein each instance of the array specifies a path to an output CMAF track of the set of output CMAF tracks, each instance of the array comprises an encoding parameter corresponding to the output CMAF track, and the encoding parameter is associated with the task instance corresponding to the output CMAF track;
prepare the content according to the CPT; and
stream the prepared content over the 5GMS network to a media streaming client.

* * * * *